United States Patent [19]

Figuly

[11] Patent Number: 4,985,536
[45] Date of Patent: Jan. 15, 1991

[54] COPOLYETHERESTER ELASTOMER WITH CYCLOALIPHATIC HARD SEGMENTS

[75] Inventor: Garret D. Figuly, Wilmington, Del.

[73] Assignee: E. I. Du Pont de Nemours and Company, Wilmington, Del.

[21] Appl. No.: 539,109

[22] Filed: Jun. 7, 1990

[51] Int. Cl.⁵ .............................................. C08G 63/02
[52] U.S. Cl. ..................................... 528/272; 528/300; 528/301; 528/307; 528/308; 525/397; 525/437
[58] Field of Search ............... 528/272, 300, 301, 307, 528/308; 525/397, 437

[56] References Cited

U.S. PATENT DOCUMENTS

| | | | |
|---|---|---|---|
| Re. 32,770 | 10/1988 | Kaplan | 606/231 |
| 3,023,192 | 2/1962 | Shivers | 528/300 |
| 3,157,619 | 11/1964 | Bell et al. | 528/274 |
| 3,238,178 | 3/1966 | Kibler et al. | 524/304 |
| 3,243,413 | 3/1966 | Bell et al. | 528/295 |
| 3,261,812 | 7/1966 | Bell et al. | 528/291 |
| 3,651,014 | 3/1972 | Witsiepe | 528/301 |
| 4,003,882 | 1/1977 | Fagerburg et al. | 528/301 |
| 4,205,158 | 5/1980 | Hoeschele | 528/300 |
| 4,221,703 | 9/1980 | Hoeschele | 524/222 |
| 4,250,280 | 2/1981 | Tanaka et al. | 525/437 |
| 4,256,860 | 3/1981 | Davis et al. | 525/437 |
| 4,292,151 | 9/1981 | Inata et al. | 204/159.15 |
| 4,349,469 | 9/1982 | Davis et al. | 524/765 |
| 4,663,399 | 5/1987 | Peters | 525/462 |
| 4,731,407 | 3/1988 | Benim et al. | 524/451 |
| 4,937,314 | 6/1990 | Greene | 528/272 |

*Primary Examiner*—Morton Foelak
*Assistant Examiner*—Sam A. Acquah

[57] ABSTRACT

An improved thermoplastic, segmented, linear copolyetherester elastomer having hard segments derived from diols and diacids which provide divalent cyclo-aliphatic radicals having a structure depicted by a formula which is

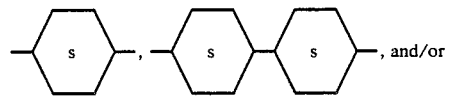 , and/or

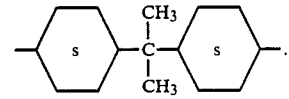

.

Preferably the diol and diacid radicals are each at least 40% trans isomer and either one or the other radical is at least 70% trans isomer. The elastomers are suited for use as rubber-band substitutes, elastic strips, elastic coatings and the like.

9 Claims, No Drawings

COPOLYETHERESTER ELASTOMER WITH CYCLOALIPHATIC HARD SEGMENTS

BACKGROUND OF THE INVENTION

1. Field of the Invention

This invention relates to a thermoplastic, segmented, linear copolyesterether elastomer which has soft segments derived from a glycol of a poly(tetramethylene oxide) or a copolymer of tetrahydrofuran and 3-methyltetrahydrofuran. More particularly, the invention concerns such an elastomer in which the hard segments are particular cycloaliphatic groups.

2. Description of the Prior Art

Various thermoplastic, segmented, linear copolyetherester elastomers have been suggested for the production of molded articles, films and fibers. Generally, such elastomers are composed of long chain ether-ester units which constitute "soft segments" of the elastomer and short chain ester units which constitute "hard segments". For use in fibers or films, at least 70% of the polyetherester elastomer chain is soft segments.

Polyetherester elastomers in which residues of cycloaliphatic acids, esters or diols are incorporated into the polymer chain are known, as for example, from Davis et al, U.S. Pat. No. 4,349,469; Bell et al, U.S. Pat. No. 3,261,812, 3,157,619 and 3,243,413; Kibler et al, U.S. Pat. No. 3,238,178; and Kaplan, U.S. Pat. No. Reissue 32,770.

The above-mentioned patents disclose the use of cyclohexane dimethanol in the manufacture of elastomer intended for conversion into fiber or film. However, fibers or films made from such elastomers usually have certain undesirable characteristics, such as high permanent set, low tensile properties and high initial modulus. An object of this invention is to provide a thermoplastic linear polyetherester elastomer that can be converted into fibers or films in which these undesirable characteristics are significantly lessened.

SUMMARY OF THE INVENTION

The present invention provides an improved thermoplastic, segmented, linear copolyetherester elastomer. The elastomer is of the type that consists essentially of a multiplicity of recurring long-chain ether-ester units and short-chain ester units connected head-to-tail through ester linkages The long-chain ether-ester units amount to at least 50 percent by weight of the elastomer and are represented by the chemical structural formula

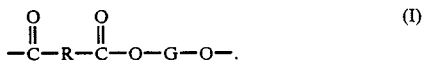

The short-chain ester units amount to 10 to 50 percent by weight of the elastomer and are represented by the chemical structural formula

In each of the structural formulae

R is a divalent radical which remains after removal of carboxyl groups from a dicarboxylic acid;

G is a divalent radical which remains after removal of hydroxyl groups from a poly(alkylene oxide) glycol and has a carbon-to-oxygen ratio in the range of 2.0 to 4.3 and a molecular weight in the range of 1,000 to 5,000, preferably 1,500 to 3,000; and D is a divalent radical remaining after removal of terminal hydroxyl groups from a diol.

The improvement of the present invention comprises the R and D radicals being the same or different and each being a divalent cycloaliphatic radical having a structural formula selected from the group consisting of

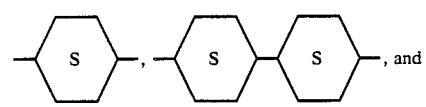

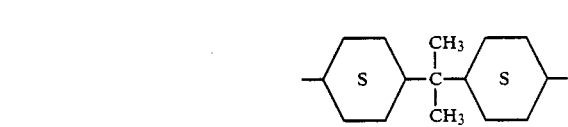

each being at least 40% trans isomer and either R or D being no less than 70% trans isomer, preferably, no less than 90% trans isomer.

Preferably, the poly(alkylene oxide)glycol is a poly(tetramethylene oxide) glycol or the glycol of a copolymer of tetrahydrofuran and 3-methyltetrahydrofuran.

The preferred weight percent of short chain ester units (i.e., hard segment) is in the range of 15 to 30, most preferably 20 to 25.

The present invention also provides fibers, films and molded articles of the copolyetherester elastomer.

DETAILED DESCRIPTION OF PREFERRED EMBODIMENTS

The invention is further illustrated by the following descriptions of preferred embodiments. These are included for the purposes of illustration and are not intended to limit the scope of the invention, which is defined by the appended claims.

In accordance with the present invention, the long chain ether-ester units, of the structure shown in Formula I above, or "soft segments", are made by reacting a cycloaliphatic dicarboxylic acid containing the radical R, the dimethyl ester thereof or such equivalent thereof, with a poly(alkylene oxide) glycol or mixtures of such glycols, containing the radical G. Preferred dicarboxylic acids that provide the desired cycloaliphatic R radicals are selected from the group consisting of 1,4-cyclohexanedicarboxylic acid, 4,4,-dicyclohexyldicarboxylic acid, 4,4'-isopropylidene-dicyclohexyldicarboxylic poly(alkylene oxide) glycol, or long-chain glycol, is poly(tetramethylene oxide) glycol or the glycol of a copolymer of tetrahydrofuran and 3-methyltetrahydrofuran. Generally, these long chain polymeric glycols have terminal (or as nearly terminal as possible) hydroxy groups and a number average molecular weight in the range of 1,000 to 5,000, preferably 1,500 to 3,000. Poly(tetramethylene oxide) glycol is the preferred glycol. The long chain glycols have a carbon-to-oxygen ratio in the range of 2 to 4.3.

The short chain ester units, or "hard segments", are polyesters formed by the reaction of one or more of the above-mentioned cycloaliphatic dicarboxylic acids with a cycloaliphatic diol that contains the radical D. Preferred diols are 1,4-cyclohexane diol, and/or dicylohexyl-4,4,-diol, and/or hydrogenated bisphenol A.

The trans and cis isomer contents of the cycloaliphatic dicarboxylic acids and cycloaliphatic diols have significant effects on the properties of the resultant elastomers. Usually, the acids and diols used to prepare the elastomers of the invention have a trans-isomer content of at least 40%. Furthermore, at least one or the other, or both the dicarboxylic acid and/or the diol has a trans-isomer content of at least 70%. Preferred elastomers are made with cycloaliphatic dicarboxylic acids that are at least 90% trans-isomer. A preferred elastomer is made with 1,4-cyclohexane diol that is 40 to 60% trans isomer. A convenient composition comprises a diol of 40 to 60% trans-isomer content and a dicarboxylic acid of 90 to 100% trans-isomer content. When a dicarboxylic acid of 90 to 100% trans-isomer content is used with a diol of at least 80% trans-isomer content, a substantially smaller percent of hard segment can be used to obtain satisfactory elastomer. When incorporated into the elastomer, the polyester formed by the reaction of the dicarboxylic acid and the diol becomes the short chain ester repeating units (hard segments) of the structure shown in Formula II above.

Usually, the hard segments of the elastomers of the invention constitute 10 to 50 percent by weight of the total elastomer. Preferably, the hard segments amount to 15 to 30%, most preferably 20 to 25%.

In accordance with the invention, the short chain ester units consist essentially of cycloaliphatic units. By "consist essentially of" is meant that about 95 percent or more by weight of the short chain ester units are poly(-cycloaliphatic ester) units. The other short chain ester units (i.e., up to 5% other units) can be derived from any combination of other alicyclic or acyclic dihydroxy compounds and/or aromatic, aliphatic or cycloaliphatic dicarboxylic acids of low molecular weight (i.e., having a molecular weight of no more than about 300), provided that these other short chain units do not detrimentally affect the properties of the resultant elastomer. Preferably, substantially all (i.e., 99-100%) of the short chain ester units are of poly(cycloaliphatic esters). Single rings containing more than 6 carbon atoms generally produce elastomers of poor quality (e.g., excessively gummy).

The term "dicarboxylic acid" as used herein, includes equivalents of such acids having two functional carboxyl groups which perform substantially as do dicarboxylic acids in reaction with glycols and diols in forming copolyetherester polymers. Such equivalents include esters and ester-forming derivatives.

The elastomers of the invention are produced conveniently by starting with a conventional ester interchange reaction. For example, the dimethyl ester of cylohexanedicarboxylic acid is heated in the presence of a catalyst at a temperature in the range of 180° to 260° C. with (a) a long chain glycol, (b) a small excess of the desired diol and (c) optionally, a small amount of branching agent. Methanol formed by the ester interchange is removed by distillation. Depending on temperature, catalyst, glycol excess and particular equipment being used, the reaction can be completed within a few minutes to a few hours. This procedure yields a prepolymer which can be increased in molecular weight by the procedure described below.

The prepolymers of the preceding paragraph can be prepared by other known methods of esterification or ester interchange For example, the long chain glycol can be reacted with a high or low molecular weight short chain ester homopolymer or copolymer in the presence of catalyst until randomization occurs The short chain ester homopolYmer or copolymer can be prepared by ester interchange from free acids with diol acetates Short chain ester polymer also can be prepared by direct esterification from suitable acids, anhydrides or acid chlorides, for example, with diols, or by other processes such as reaction of the acids with cyclic ethers or carbonates. The prepolymer also can be prepared by these reactions in the presence of long chain glycol.

Prepolymer, prepared as described in the preceding paragraphs, can be increased to higher molecular weights by distillation of the excess of diol, as in known polycondensation methods. Additional ester interchange occurs during this polycondensation or distillation. The distillation increases the molecular weight and randomizes the arrangement of copolyester units. Best results usually are obtained when the final distillation or polycondensation is performed under vacuum at a pressure below 0.5 mm of Hg and at a temperature in the range of 220° to 240° C. for less than 6 hours (e.g., 0.5 to 5 hours in the presence of conventional antioxidants). Most practical polymerization techniques rely upon, ester interchange to complete the polymerization reaction. To avoid excessively long periods at high temperatures, with attendant possible thermal degradation, a catalyst for the ester interchange reaction can be employed.

If desired, a branching agent can be included in the polymerization mix, as disclosed by Hoeschele, U.S. Pat. No. 4,205,158, column 3, lines 35 through 66, which disclosure is hereby incorporated herein by reference.

Ester interchange polymerizations generally are performed in the melt without solvent. However, inert solvents can be used to facilitate removal of volatile components from the polymerization mix. This technique is especially useful in making prepolymer by direct esterification. Polycondensation of prepolymer can also be accomplished in the solid phase by heating particles of solid prepolymer under vacuum or in a stream of inert gas to liberate and remove low molecular weight diol.

The processes described above can be performed as batch or continuous processes. The preferred method for continuous polymerization is by ester interchange with a prepolymer. Such continuous ester interchange polymerizations are similar to established commercial processes. Conventional additives can be incorporated into the elastomers of this invention by known techniques. Such additives include antioxidants, ultraviolet light stabilizers, inorganic fillers, fibers, pigments, and the like.

Melt-spun fibers of the invention can be processed in conventional elastic fiber operations, such as heat treatment (relaxed or under tension), hot drawing, weaving, knitting, dyeing and the like. The elastomer of the invention also can be formed or molded into sheets, and various other forms for use as strips, gaskets, facings, barrier films, clear and colorless coatings, and the like. The elastomer can also be used as a base polymer for adhesives and adhesive applications.

Test Procedures

Various characteristics and properties mentioned in the preceding discussion and in the Examples below were determined by the following test procedures.

Inherent viscosity, $\eta_{inh}$, is determined in deciliters per gram (dL/g), in accordance with W. R. Sorenson and T. W. Campbell, "Preparative Methods of Polymer Chemistry", Interscience Publishers, 2nd Ed. (1968) p. 44. A solution of 0.5 gram of polymer in 100 ml of m-cresol at 30° C. is used. In the Examples, elastomer inherent viscosity was measured immediately after its preparation (i.e., before further processing).

The concentration of the hard segment in the polymer is calculated by the following formula, $$\% \ HS = \text{weight percent hard segment} = \frac{100(M_{hs})[(w_1/M_1) - (w_2/M_2)]}{(M_{hs})[(w_1/M_1) - (w_2/M_2)] + (M_{ss})(w_2/M_2)}$$

wherein
w is weight
M is molecular weight
hs refers to the repeat unit of the hard segment (short chain ester of Formula I)
ss refers to the repeat unit of the soft segment (long chain ester of Formula II)
1 refers to the dimethyl ester of the starting diacid
2 refers to the long chain glycol.

Number average molecular weight of the glycol is determined by reacting the glycol with an excess of acetic anhydride in pyridine and then back-titrating with sodium hydroxide to measure the amount of acetic acid produced and calculating the molecular weight therefrom.

Strip or fiber properties of tenacity at break, $T_b$, and initial modulus $M_i$, both in deciNewtons per tex and percent elongation at break, $E_b$, are measured on an Instron Tester equipped with Series 2712 (002) Pneumatic Action Grips in accordance with ASTM Method D 2653–72. "Unload power", in milliNewtons per effective tex (i.e., mN/tex(eff)) is measured according to the general method of ASTM D 2731-72. Three filaments or strips, a 2-inch (2.5-cm) gauge length and a zero-to-300% elongation cycle are used for each determination. Unload power (i.e., the stress at a particular elongation) is measured after subjecting the samples to five 0-to-300% elongation cycles at a constant elongation rate of 800% per minute and holding the sample extended after the fifth extension then for 30 seconds. Then, while unloading from the last extension, the stress, or unload power, is measured at an elongation of 167% and is designated and $UP_{167}$; The % set also is measured in accordance with ASTM Method D 2731–72 Values of $T_b$, Eb, % Set UP and $M_i$ reported herein are the averages of at least three determinations.

Properties of compression molded elastomer samples are measured by ASTM test methods: specific gravity by ASTM D297; Shore A Durometer hardness by ASTM D2240; tensile strength, modulus at 100%, modulus at 300% and % ultimate elongation by ASTM D412; Taber abrasiony ASTM D3389; and Pico Abrasion Index by AsTM D2228.

For convenience, the following abbreviations are employed herein, particularly in the examples:
t refers to trans isomer
c refers to cis isomer
HDMT 1,4-dimethylcyclohexane dicarboxylate (also called hydrogenated dimethyl terephthalate)
HPG 1,4-cyclohexanediol (also called hydrogenated phenylene glycol or hydrogenated hydroquinone)
HBPA hydrogenated bisphenol A
DCHD dicylohexyl-4,4'-diol
CHDMeOH 1,4-cYclohexanedimethanol
P04G poly(tetramethylene oxide)glycol
THF/MeTHF copolYmer of tetrahydrofuran and 3-methyltetrahydrofuran)
TBT tetrabutyl titanate esterification catalyst
AO-330 1,3,5-trimethyl-2,4,6-tris[3,5-di-t-butyl-4-hydroxy-benzyl]benzene antioxidant (sold by Ethyl Corp.)
SS soft segment of elastomer
HS hard Segment of elastomer
HS/SS mole ratio of hard to soft segment
HS percent hard segment (based on total weight of elastomer)
MWss molecular weight of long chain glycol
$T_{ex}$ melt extrusion temperature in ° C.

When a trans or cis isomer content of an ingredient or radical is reported herein, the content is given as a nominal percentage, which is usually within about five percentage units of the actual percentage. An ingredient reported as being 100% of a particular isomer, has at least about 95%, and probably between 98 and 100% of that particular isomer. If the % is reported for only one isomer, the remainder is the other isomer.

The examples which follow are illustrative of the invention but are not intended to limit its scope, which is defined by the claims. The results reported herein are believed to be representative, but do not constitute all the runs involving the indicated ingredients. In the examples, tables and figures, samples identified with Arabic numerals are of the invention and those identified with upper-case letters are comparison samples which are outside the invention.

EXAMPLES

The following examples describe the production and physical properties of strips, filaments, or molded articles made from a variety of elastomers having cycloaliphatic hard segments in accordance with the invention. The elastomers of the invention are compared to similar elastomers having cycloaliphatic hard segments that contain methylene spacer groups (i.e., a hard segment derived from 1,4-cyclohexanedimethanol) which segments place the elastomers outside the invention. Usually, unless indicated otherwise, the elastomers are made with soft segments having a number average molecular weight of about 2,000 and with hard segments amounting to about 10 to about 50% of the total elastomer weight.

In each of the examples, elastomer ingredients were polymerized in a kettle of 0.35-liter capacity. The kettle was equipped with a mechanical stirrer, an inlet for nitrogen gas, a Wood,s metal heating bath and a vacuum distillation column. For each polymerization, the polymer-forming ingredients were loaded into the kettle along with 150 milligrams of AO-330 antioxidant and 1.5 milliliters of a 5% solution of TBT catalyst in ethylene glycol. After loading the ingredients, the kettle was purged with nitrogen and placed in the bath, which was heated and maintained at a temperature of 240° C. The ingredients were stirred rapidly for 45 minutes and then, over the course of about 90 minutes, the pressure inside the kettle was reduced to a pressure in the range of about 0.50 to 0.25 mm Hg. Stirring was continued for 1 to 4 hours until a viscous melt was obtained. The molten polymer was then removed from the kettle and extruded into strip or filament (Examples I-V) or molded (Example VI). A slot orifice measuring about 20-mm (0.75-inch) long and 0.4-mm (0.015-inch) was used to produce the strips. An extrusion capillary of 0.23-mm (0.009-inch) diameter and 0.69-mm (0.027-inch) length was used to produce the filaments. The weights of the polymer-forming ingredients are listed in summary tables of the examples along with physical properties of the extruded or molded elastomer samples.

Example I

This example illustrates the production of three samples of elastomeric strips in accordance with the invention. The elastomers differ in soft segment composition and molecular weight. The soft segments of Samples 1 and 2 were derived from PO4G of 2,000 and 2,900 molecular weight, respectively, and the soft segments of Sample 3 were derived from THF/MeTHF copolymer glycol in which the MeTHF amounted to 3 percent of the copolymer. The hard segments of each elastomer were derived from DMHT (100% trans isomer) and HPG (50% trans isomer, 50% cis isomer) and amounted to 23% of the total elastomer weight. The ingredients and conditions of preparation of the elastomer strips and their resultant as-extruded properties are summarized in Table I, below. Table I illustrates the particularly advantageous combination of tensile, unload and set properties for these elastomeric strips of the invention.

TABLE I
(Example I)

|  | Sample No. | | |
| --- | --- | --- | --- |
|  | 1 | 2 | 3 |
| Ingredients (grams) | | | |
| 100% t-DMHT | 10.18 | 9.33 | 9.54 |
| 50% t-HPG | 4.23 | 4.23 | 4.23 |
| Soft segment | 28.84 | 29.42 | 29.28 |
| Resultant Elastomer | | | |
| $\eta_{inh}$, dL/g | 1.64 | 1.65 | 1.56 |
| $T_{ex}$ °C. | 220 | 203 | 180 |
| Strip Properties | | | |
| linear density, dtex | 2,880 | 3,530 | 6,470 |
| $T_b$, deciNewtons/tex | 0.27 | 0.30 | 0.18 |
| $E_b$, % | 645 | 840 | 1010 |
| $UP_{167}$, mN/eff tex | 1.91 | 1.29 | 2.23 |
| % set | 25 | 28 | 23 |
| $M_i$, deciNewtons/tex | 0.039 | 0.031 | 0.031 |

Example II

This example illustrates, the effect of hard segment content of elastomers of the invention on the properties of strips made therefrom. The soft segments of each of the elastomer samples (Samples 4–7 and Sample 1 repeated from Example 1) were derived from PO4G of 2,000 molecular weight. The hard segments of each elastomer were derived from DMHT (100% trans isomer) and HPG (50% trans isomer, 50% cis isomer), except Sample 4, in which the HPG component was 100% trans isomer. The hard segment content of the elastomers ranged from 10.5% (Sample 4) to 50% (Sample 7) of the total elastomer weight. The weights of the ingredients and the conditions used in preparation of the elastomers and their resultant as-extruded strip properties are summarized in Table II, below.

Table II shows that within the range of hard segments exemplified here for elastomers of the invention, the sample in the preferred range of hard segment content (Sample 1), with a hard segment content of 23% of the total elastomer weight, had the desirable characteristics of the highest tenacity, a high break elongation, a high unload power, the lowest set, and a satisfactory modulus. As noted above, all samples for this example were prepared with 50% t-HPG, except Sample 4 which was prepared with 100% t-HPG. The 100% trans isomer was needed for the HPG of Sample 4, because when a 50% t-HPG was used to prepare an elastomer having only 10.5 weight percent hard segment, a gummy product resulted which could not be extruded into an adequate elastic strip.

TABLE II
(Example II)

|  | Sample No. | | | | |
| --- | --- | --- | --- | --- | --- |
|  | 4 | 1 | 5 | 6 | 7 |
| Ingredients (grams) | | | | | |
| 100% t-DMHT | 6.68 | 10.18 | 13.54 | 14.95 | 17.74 |
| 50% t-HPG | 0.00 | 4.23 | 6.44 | 7.36 | 9.21 |
| 100% t-HPG | 1.93 | 0.00 | 0.00 | 0.00 | 0.00 |
| PO4G | 33.52 | 28.84 | 24.34 | 22.47 | 18.73 |
| Resultant Elastomer | | | | | |
| % hard segment | 10.5 | 23 | 35 | 40 | 50 |
| $\eta_{inh}$ | 1.78 | 1.64 | 1.24 | 1.01 | 0.75 |
| $T_{ex}$, °C. | 197 | 220 | 175 | 183 | 190 |
| Strip Properties | | | | | |
| dtex | 4,820 | 2,880 | 2,650 | 1,060 | 2,550 |
| $T_b$ | 0.06 | 0.27 | 0.16 | 0.15 | 0.06 |
| $E_b$ | 578 | 645 | 682 | 466 | 230 |
| $UP_{167}$ | 0.43 | 1.91 | 2.26 | 2.22 | * |
| % set | 42 | 25 | 41 | 55 | * |
| $M_i$ | 0.011 | 0.039 | 0.078 | 0.109 | 0.206 |

*Because $E_b$ was less than 300%, these properties could not be measured.

EXAMPLE III

The effects on properties of strips prepared from elastomers of the invention having different cis and trans isomer contents of the constituents which formed the hard segments of the elastomers are illustrated in this example. The soft segments of each of the elastomer samples were derived from PO4G of 2,000 molecular weight. The hard segments of each elastomer were derived from DMHT (of 100% trans isomer, or of 50% trans and 50% cis isomer, or mixtures thereof) and HPG (of 100% trans isomer, or of 50% trans and 50% cis isomer, or mixtures thereof). Hard segments amounted to 23% of the total weight of each elastomer sample. Weights of the ingredients and conditions used in preparation of the elastomers and the resultant as-extruded strip properties are summarized in Tables III and IV below. The results with Samples 8–11 are compared to those obtained with Sample 1 in Table III. The results with Samples 12 and 13 are compared to those obtained with Samples 1 and Comparison A in Table IV.

The elastomer samples of Table III (Samples 1 from Example 1 and 8–11) were prepared with DMHT of 100% trans isomer and with HPG of trans isomer content which was varied from 50% (Sample 1) to 100% (Sample 11). The table shows that for elastomers of the invention in which the acid residue of the hard segment is 100% trans isomer and the trans isomer content of the diol residue is in the range of nominally 50 to 100%, satisfactory elastomer strip properties are obtained. However, when both acid and diol residues are of 100% trans isomer, the tenacity, unload power, elongation, and modulus of the resultant extruded strips are lower and the percent set higher than for the other samples.

TABLE III (Example III, Samples 1, 8-11)

| | Sample No. | | | | |
|---|---|---|---|---|---|
| | 1 | 8 | 9 | 10 | 11 |
| Ingredients (grams) | | | | | |
| 100% t-DMHT | 10.18 | 10.18 | 10.18 | 10.18 | 10.18 |
| 100% t-HPG | 0.00 | 1.69 | 2.54 | 3.38 | 4.23 |
| 50% t-HPG | 4.23 | 2.54 | 1.69 | 0.85 | 0.00 |
| PO4G | 28.84 | 28.84 | 28.84 | 28.84 | 28.84 |
| Resultant Elastomer | | | | | |
| % t of acid | 100 | 100 | 100 | 100 | 100 |
| % t of diol | 50 | 70 | 80 | 90 | 100 |
| $\eta_{inh}$ | 1.64 | 1.49 | 1.61 | 1.20 | 1.01 |
| $T_{ex}$, °C. | 220 | 189 | 213 | 216 | 202 |
| Strip Properties | | | | | |
| dtex | 2,880 | 3,250 | 3,540 | 5,770 | 6,150 |
| $T_b$ | 0.27 | 0.24 | 0.25 | 0.11 | 0.04 |
| $E_b$ | 645 | 872 | 868 | 767 | 286 |
| $UP_{167}$ | 1.91 | 1.44 | 1.35 | 0.87 | 0.73 |
| % set | 25 | 30 | 39 | 60 | 69 |
| $M_i$ | 0.039 | 0.035 | 0.050 | 0.061 | 0.028 |

The elastomer samples of Table IV below were prepared with different trans isomer contents of the acid and diol components, as follows: Sample 1, 100% t-acid and 50% t-diol; Sample 12, 50% t-acid and 100% t-diol; Sample 13, 70% t-acid and 50% t-diol; and Comparison A, 50% t-acid and 50% t-diol. The results summarized in Table III, show that if the residues of both components of the hard segment have trans isomer contents of less than a nominal 50%, the resultant elastomer is inadequate for extrusion into strips. The results also show that if one component has no more than 50% trans isomer content, the other component should have a nominal trans isomer content of at least 70%.

TABLE IV (Example III, Samples 1, 12-13 Comparison A)

| | Sample No. | | | |
|---|---|---|---|---|
| | 1 | 12 | 13 | A |
| Ingredients (grams) | | | | |
| 100% t-DMHT | 10.18 | 5.09 | 7.13 | 0.00 |
| 50% t-DMHT | 0.00 | 0.00 | 0.00 | 10.18 |
| 100% c-DHMT | 0.00 | 5.09 | 3.05 | 0.00 |
| 100% t-HPG | 0.00 | 4.23 | 0.00 | 0.00 |
| 50% t-HPG | 4.23 | 0.00 | 4.23 | 4.23 |
| PO4G | 28.84 | 28.84 | 28.84 | 28.84 |
| Resultant Elastomer | | | | |
| % t of acid | 100 | 50 | 70 | 50 |
| % t of diol | 50 | 100 | 50 | 50 |
| $\eta_{inh}$ | 1.64 | 1.55 | 1.64 | 1.43 |
| $T_{ex}$, °C. | 220 | 195 | 169 | * |
| Strip Properties | | | | |
| dtex | 2,880 | 5,060 | 7,450 | * |
| $T_b$ | 0.27 | 0.19 | 0.19 | * |
| $E_b$ | 645 | 884 | 941 | * |
| $UP_{167}$ | 1.91 | 1.43 | 1.14 | * |
| % set | 25 | 37 | 19 | * |
| $M_i$ | 0.039 | 0.041 | 0.022 | * |

*Strip could not be extruded.

Example IV

This example compares properties of extruded strips made with elastomers of the invention (Samples 1 of Example I and Sample 4 of Example II) whose hard segments contain residues of 1,4-cyclohexanediol ("HPG") versus those of strips made with elastomers (Comparisons B, C and D) whose hard segments contain residues of 1,4-cyclohexanedimethanol ("CHDMeOH"). CHDMeOH is a diol used in the art for preparing copolyetherester elastomers whose hard segments appear to be very similar to those of the elastomers of the invention.

Table V be-owl summarizes the comparison of the extruded elastomer strip properties. Note that the properties of the strips of the elastomers which incorporate HPG residues in accordance with the invention provide much superior low modulus properties as well as significantly lower set values than the comparison strips made of the elastomers which incorporate CHDMeOH residues. Note also that the strips of the invention do not require the residues of both the diol and and acid components of the hard segment to be 100% trans isomers to obtain satisfactory elastomer characteristics. In contrast, 100% trans isomers are needed for both the diol and the acid of the comparison elastomers when the CHDMeOH is used. The ability to use other than 100% trans isomer for both components is a significant cost advantage for the elastomers of the invention.

TABLE V (Samples 4, 1 and Comparisons B, C, D)

| | Sample No. | | | | |
|---|---|---|---|---|---|
| | 4 | 1 | B | C | D |
| Ingredients (grams) | | | | | |
| 100% t-DMHT | 6.68 | 10.18 | 9.45 | 9.45 | 6.62 |
| 50% t-HPG | 0.00 | 4.23 | 0.00 | 0.00 | 0.00 |
| 100% t-HPG | 1.93 | 0.00 | 0.00 | 0.00 | 0.00 |
| 100% t-CHDMeOH | 0.00 | 0.00 | 0.00 | 4.73 | 2.39 |
| 50% t-CHDMeOH | 0.00 | 0.00 | 4.73 | 0.00 | 0.00 |
| PO4G | 33.52 | 28.84 | 28.84 | 28.84 | 33.11 |
| Resultant Elastomer | | | | | |
| % HS | 10.5 | 23 | 23 | 23 | 11.6 |
| $\eta_{inh}$ | 1.78 | 1.64 | 1.56 | 1.57 | 1.67 |
| $T_{ex}$, °C. | 197 | 220 | * | 155 | ** |
| Strip Properties | | | | | |
| dtex | 4,820 | 2,880 | * | 7,370 | ** |
| $T_b$ | 0.06 | 0.27 | * | 0.19 | ** |
| $E_b$ | 578 | 645 | * | 758 | ** |
| $UP_{167}$ | 0.43 | 1.91 | * | 2.15 | ** |
| % set | 42 | 25 | * | 53 | ** |
| $M_i$ | 0.011 | 0.039 | * | 0.086 | ** |

*No melt strength at 125° C.
**No melt strength at 65° C.

The elastomers of Sample 1 and Comparison C were extruded into filaments to further demonstrate that elastomers of the invention (which are made with mixtures of tarns, cis isomers in the hard segments) can be formed into filaments which compare favorably with similar filaments formed from elastomers of the type known in the art which have 100% trans hard segments containing the residue of CHDMeOH. Elastomer of Sample 1 was extruded into filaments at a temperature of 179° C. (except part a, which was extruded at 184° C.); elastomer of Comparison Sample C, at 165° C. The as-extruded filaments were then drawn to twice, thrice and four times their original as-extruded length (i.e., draw ratios of 2.0, 3.0 and 4.0) between two pairs of rolls, a slower moving pair of take up rolls which rotated at a peripheral speed of 40 meters per minute, and a more rapidly rotating pair of draw rolls. The drawn filaments were of 10 to 20 dtex. Properties of the as-extruded and drawn filaments are summarized in the Table VI.

TABLE VI

| | Part | | | |
|---|---|---|---|---|
| | a | b | c | d |
| Draw Ratio | 1.0 | 2.0 | 3.0 | 4.0 |
| Sample 1 | | | | |
| $T_b$, dN/tex | 0.28 | 0.46 | 0.55 | 0.90 |
| $E_b$, % | 674 | 473 | 336 | 210 |

TABLE VI-continued

| | Part | | | |
|---|---|---|---|---|
| | a | b | c | d |
| UP₁₆₇, mN/eff tex | 2.2 | 3.0 | 3.7 | * |
| % set | 20 | 24 | 36 | * |
| M$_i$, dN/tex | 0.034 | 0.030 | 0.036 | 0.042 |
| Comparison C | | | | |
| T$_b$, dN/tex | 0.26 | 0.30 | 0.50 | 0.48 |
| E$_b$, % | 461 | 322 | 241 | 226 |
| UP₁₆₇, mN/eff tex | 3.5 | 3.9 | * | * |
| % set | 40 | 40 | * | * |
| M$_i$, dN/tex | 0.078 | 0.084 | 0.079 | 0.075 |

*These properties could not be measured.

Note that the superior tenacity and break elongation of filaments of the invention over those of Comparison C is also accompanied by desirably lower values of set and modulus.

Example V

This example illustrates the invention with the preparation of elastomers in which the hard segments are residues of trans-DMHT in combination with cis,trans hydrogenated bisphenol A ("HPBA") (Samples 14–16) or with cis,trans 4,4,-dicyclohexyldiol ("DCHD") (Sample 17). Each cis,trans mixture is nominally a 50/50 mixture of the isomers. The soft segments of each elastomer sample are formed with PO4G of 2,000 number average molecular weight. Strips of the elastomers of Samples 14 and 15 were drawn as in Example IV to five times as-extruded length to show the favorable effects of drawing on these elastomers of the invention (see Table VII).

TABLE VII

| | Sample No. | | | |
|---|---|---|---|---|
| | 14 | 15 | 16 | 17 |
| Ingredients (grams) | | | | |
| t-DMHT | 7.77 | 8.13 | 9.00 | 6.98 |
| c,t-HBPA | 5.87 | 6.38 | 7.66 | 0.00 |
| c,t-DCHD | 0.00 | 0.00 | 0.00 | 3.79 |
| PO4G | 28.84 | 28.09 | 26.22 | 31.46 |
| Elastomer | | | | |
| % HS | 23 | 25 | 30 | 16 |
| η$_{inh}$ | 1.45 | 1.56 | 1.28 | 1.69 |
| T$_{ex}$, °C. | 203 | 202 | 214 | 189 |
| dtex** | 8,430 | 10,000 | 3,210 | 6,190 |
| Strip | | | | |
| drawn | No | Yes | No | Yes | No | No |
| T$_b$ | 0.16 | 0.22 | 0.16 | 0.36 | 0.12 | 0.19 |
| E$_b$ | 879 | 232 | 727 | 240 | 621 | 1,080 |
| UP₁₆₇ | 1.39 | * | 1.52 | 2.20 | 1.37 | 0.60 |
| % set | 36 | * | 34 | 37 | 47 | 36 |
| M$_i$ | 0.05 | 0.08 | 0.05 | 0.07 | 0.06 | 0.02 |

*These properties could not be measured.
**dtex before drawing

EXAMPLE VI

The elastomer of Sample 1 of Example I was compression molded at about 160° C. under a pressure of about 14,000 kiloPascals (about 2,000 psi) into plaques measuring about 15-cm by about 15-cm wide by about 0.18-cm thick (6 by 6 by 0.070 inch). The plaques had a specific gravity of 1.03 grams/cm³, a Shore A hardness of 60, a tensile strength of 1,780 psi (1,230 N/cm²), tensile moduli at 100% and 300% elongation of 282 psi (195 N/cm²) and 444 psi (306 N/cm²) respectively, an ultimate elongation of 925%. a Taber abrasion of 16 (mg/1,000 rev) and a Pico abrasion index of 141.

I claim:

1. An improved thermoplastic, segmented, linear copolyetherester elastomer which consists essentially of a multiplicity of recurring long-chain units and short-chain ether-ester units connected head-to-tail through ester linkages, the long-chain units amounting to at least 50 percent by weight of the elastomer and being represented by the structural formula

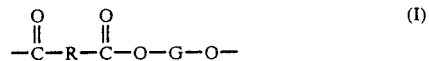  (I)

short-chain ester units amounting to 10 to 50 percent by weight of the elastomer and being represented by the structural formula

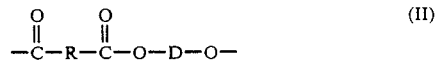  (II)

in which
R is a divalent radical which remains after removal of carboxyl groups from a dicarboxylic acid,
G is a divalent radical which remains after removal of hydroxyl groups from a poly(alkylene oxide) glycol having a carbon-to-oxygen ratio in the range of 2.0 to 4.3 and a molecular weight in the range of 1,000 to 5,000, and
D is a divalent radical remaining after removal of terminal hydroxyl groups from a diol, wherein the improvement comprises
the R and D radicals being the same or different,
R and D each being a divalent cycloaliphatic radical having a structural formula selected from the group consisting of

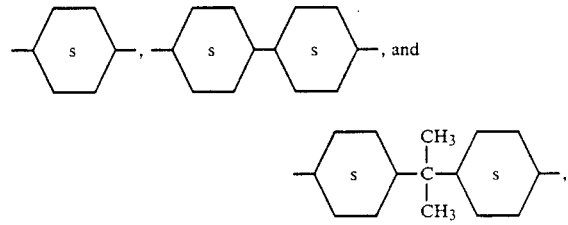

R and D each being at least 40% trans isomer and either the R or D radical being at least 70% trans isomer.

2. An elastomer in accordance with claim 1 wherein the poly(alkylene oxide) glycol is a poly(tetramethylene oxide) glycol or a glycol of a copolymer of tetrahydrofuran and 3-methyltetrahydrofuran having a molecular weight in the range of 1,500 to 3,000.

3. An elastomer in accordance with claim 2 wherein the weight percent of short chain ester units is in the range of 15 to 30.

4. An elastomer in accordance with claim 2 wherein the weight percent of short chain ester units is in the range of 20 to 25% and the glycol is a poly(tetramethylene oxide) glycol.

5. An elastomer in accordance with claim 1, 2, or 4 wherein the trans isomer content of the R or D radical is at least 90%.

6. A use of the elastomer of claim 1 to form a shaped article.

7. A use in accordance with claim 6 wherein the shaped article is a melt-spun strip, fiber or filament.

8. A use in accordance with claim 7 wherein the the strip, fiber or filament is a drawn strip, fiber or filament.

9. A use in accordance with claim 6 wherein the shaped article is a molded object.

* * * * *

UNITED STATES PATENT OFFICE
CERTIFICATE OF CORRECTION

PATENT NO. : 4,985,536
DATED : January 15, 1991
INVENTOR(S) : Garret D. Figuly

It is certified that error appears in the above-identified patent and that said Letters Patent is hereby corrected as shown below:

In the Claims:

Claim 5

In Column 12, line 57, after "2," insert --3,--

Signed and Sealed this

Twenty-third Day of June, 1992

Attest:

DOUGLAS B. COMER

*Attesting Officer*     *Acting Commissioner of Patents and Trademarks*